US012157706B2

(12) United States Patent
Shetterley et al.

(10) Patent No.: US 12,157,706 B2
(45) Date of Patent: *Dec. 3, 2024

(54) COMPOSITIONS FOR IMPROVED CONCRETE PERFORMANCE

(71) Applicant: E5 Incorporated, Noblesville, IN (US)

(72) Inventors: William Archie Joseph Shetterley, Fortville, IN (US); Dustin A. Hartman, Boggstown, IN (US); Christopher Wolf, Carmel, IN (US)

(73) Assignee: E5 Incorporated, Noblesville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,706

(22) Filed: Mar. 5, 2024

(65) Prior Publication Data

US 2024/0199502 A1 Jun. 20, 2024

Related U.S. Application Data

(63) Continuation of application No. 18/114,214, filed on Feb. 24, 2023, now Pat. No. 11,919,823, which is a continuation of application No. 16/501,311, filed on Mar. 22, 2019, now Pat. No. 11,884,600.

(60) Provisional application No. 62/765,597, filed on Sep. 1, 2018, provisional application No. 62/761,393, filed on Mar. 22, 2018.

(51) Int. Cl.
| | | |
|---|---|---|
| C04B 40/00 | (2006.01) | |
| C04B 7/36 | (2006.01) | |
| C04B 14/06 | (2006.01) | |
| C04B 28/02 | (2006.01) | |
| C04B 40/06 | (2006.01) | |
| C04B 41/00 | (2006.01) | |
| C04B 111/60 | (2006.01) | |

(52) U.S. Cl.
CPC .......... *C04B 40/0032* (2013.01); *C04B 7/361* (2013.01); *C04B 14/06* (2013.01); *C04B 14/062* (2013.01); *C04B 28/02* (2013.01); *C04B 40/0039* (2013.01); *C04B 40/0046* (2013.01); *C04B 40/0608* (2013.01); *C04B 41/0018* (2013.01); *C04B 41/009* (2013.01); *C04B 2111/60* (2013.01); *C04B 2201/52* (2013.01)

(58) Field of Classification Search
CPC ... C04B 14/062; C04B 14/06; C04B 40/0032; C04B 40/0039; C04B 28/02; C04B 28/04; C04B 40/0028; C04B 2103/0029; C04B 2111/00008; C04B 2111/27; C04B 2111/60; C04B 2111/20; E01C 19/002; E04F 15/12; Y02W 30/91

See application file for complete search history.

(56) References Cited

U.S. PATENT DOCUMENTS

| | | | |
|---|---|---|---|
| 4,144,086 | A | 3/1979 | Helgesson |
| 4,495,228 | A | 1/1985 | Cornwell |
| 4,640,715 | A | 2/1987 | Heitzmann |
| 4,804,563 | A | 2/1989 | Hillemeier |
| 4,940,348 | A | 7/1990 | Akers et al. |
| 5,149,370 | A | 9/1992 | Olaussen et al. |
| 5,352,288 | A | 10/1994 | Mallow |
| 5,472,501 | A | 12/1995 | Dastol |
| 5,554,352 | A | 9/1996 | Jaques |
| 5,843,216 | A | 12/1998 | Dastol |
| 6,251,180 | B1 | 6/2001 | Engstrand |
| 6,372,694 | B1 | 4/2002 | Osinga |
| 6,387,173 | B2 | 5/2002 | Greenwood |
| 6,765,153 | B2 | 7/2004 | Goodson |
| 6,855,200 | B2 | 2/2005 | De Marco |
| 7,021,380 | B2 | 4/2006 | Caveny et al. |
| 7,073,585 | B2 | 7/2006 | Morgan et al. |
| 7,238,733 | B2 | 7/2007 | Vijn et al. |
| 7,393,407 | B2 | 7/2008 | Dingsoyr |
| 7,617,870 | B1 | 11/2009 | Roddy |
| 8,048,219 | B2 | 11/2011 | Woolfsmith |
| 8,147,609 | B2 | 4/2012 | Jau |
| 8,172,938 | B2 | 5/2012 | Alright |
| 8,177,930 | B2 | 5/2012 | Chanvillard |
| 8,585,819 | B2 | 11/2013 | Al-Bagoury |
| 8,598,093 | B2 | 12/2013 | Roddy |
| 8,653,186 | B2 | 2/2014 | Nicoleau |
| 8,685,903 | B2 | 4/2014 | Ravi |

(Continued)

FOREIGN PATENT DOCUMENTS

| | | |
|---|---|---|
| DE | 4203476 A1 | 4/1993 |
| EP | 0858981 A1 | 8/1998 |

(Continued)

OTHER PUBLICATIONS

Jonathan Samuel Belkowitz, The Investigation of Nano Silica in the Cement Hydration Pro, Research Thesis, Jan. 1, 2009, University of Denver, https://digitalcommons.du.edu/etd/761/.

(Continued)

*Primary Examiner* — Anthony J Green
(74) *Attorney, Agent, or Firm* — Reichel Stohry Dean LLP; Mark C. Reichel; Natalie J. Dean

(57) ABSTRACT

In various embodiments, a process is described for the preparation of a concrete mixture in a Ready-mix or for an installation. A quantity of amorphous silica is added with an average particle size in the range of from about 1 to about 55 nanometers and/or wherein the surface area of the particles of the amorphous silica is in the range of from about 50 to about 900 m2/g. The amorphous silica may be added in colloidal form or otherwise, and is added at a particular stage to ensure efficacy.

20 Claims, 1 Drawing Sheet

(56) References Cited

U.S. PATENT DOCUMENTS

| | | | |
|---|---|---|---|
| 8,858,703 | B1 | 10/2014 | Dongell |
| 9,186,697 | B2 | 11/2015 | Bonin |
| 9,512,351 | B2 | 12/2016 | Roddy et al. |
| 9,630,880 | B2 | 4/2017 | Alhozaimy |
| 9,670,096 | B1 | 6/2017 | Zubrod |
| 9,765,252 | B2 | 9/2017 | Roddy et al. |
| 9,878,949 | B2 | 1/2018 | Posklak et al. |
| 11,279,658 | B2 | 3/2022 | Hartman et al. |
| 11,884,600 | B2 * | 1/2024 | Hartman .............. C04B 14/062 |
| 11,919,823 | B2 | 3/2024 | Hartman et al. |
| 2002/0014187 | A1 | 2/2002 | Greenwood |
| 2005/0000178 | A1 | 1/2005 | Rodgers et al. |
| 2006/0086503 | A1 | 4/2006 | Reddy |
| 2007/0266906 | A1 | 11/2007 | Garcia |
| 2010/0285224 | A1 | 11/2010 | Fisher |
| 2011/0083585 | A1 | 4/2011 | Fonollosa |
| 2013/0319294 | A1 | 12/2013 | Gehrig |
| 2014/0013683 | A1 | 1/2014 | Yin et al. |
| 2015/0038389 | A1 | 2/2015 | De Wit et al. |
| 2015/0299041 | A1 | 10/2015 | Wetherell et al. |
| 2016/0176758 | A1 | 6/2016 | Muller et al. |
| 2016/0244375 | A1 | 8/2016 | Maier |
| 2016/0272542 | A1 | 9/2016 | Monkman et al. |
| 2017/0321104 | A1 | 11/2017 | Ravi et al. |
| 2017/0334089 | A1 | 11/2017 | Rieder et al. |
| 2018/0244575 | A1 | 8/2018 | Fernandez Lozano et al. |

FOREIGN PATENT DOCUMENTS

| | | |
|---|---|---|
| EP | 1683768 A1 | 7/2006 |
| JP | 2003-534227 A | 11/2003 |
| JP | 2007-197308 A | 8/2007 |
| JP | 2009-073698 A1 | 4/2009 |
| JP | 2011-144078 A1 | 7/2011 |
| JP | 2017-507821 A | 3/2017 |
| KR | 10-0598241 B1 | 7/2016 |
| WO | 91/03437 | 3/1991 |
| WO | 91/06513 A1 | 5/1991 |
| WO | 1998/012149 A1 | 3/1998 |
| WO | 2013/151439 A1 | 10/2013 |
| WO | 2016/081080 A1 | 5/2016 |
| WO | 2016/114796 A1 | 7/2016 |

OTHER PUBLICATIONS

Du et al., "Durability performances of concrete with nano-silica," Construction and Building Materials, (2014), Issue 73, pp. 705-712.
Hsie et al., "Mechanical properties of polypropylene hybrid fiber-reinforced concrete," Materials Science and Engineering A., (2008), Issue 494, pp. 153-157.
GCP Applied Technologies Inc., "Admixture Dispenser Discharge Line Location and Sequencing for Concrete Batching Operations," Tech Bulletin, (2016), pp. 1-3.
Madandoust et al., "Fresh and hardened properties of self-compacting concrete containing metakaolin," Construction and Building Materials, (2012), Issue 35, pp. 752-760.
Brand et al., "Initial moisture and mixing effects on higher quality recycled coarse aggregate concrete," Construction and Building Materials, (2015), Issue 79, pp. 83-89.
Japanese Patent Office, Notice of Reasons for Refusal, Japanese Patent Application Serial No. 2020-570392, dated Mar. 28, 2023.
Japanese Patent Office, Notice of Reasons for Refusal, Japanese Patent Application Serial No. 2021-500779, dated Mar. 28, 2023.
Intellectual Property India, Examination Report, Indian Patent Application Serial No. 2020-17043947, dated May 4, 2022.
Intellectual Property India, Examination Report, Indian Patent Application Serial No. 2021-27008274, dated Sep. 16, 2022.
International Searching Authority, International Search Report, PCT/US2019/000009, dated Aug. 19, 2019.
International Searching Authority, Written Opinion of the International Searching Authority, PCT/US2019/000009, dated Aug. 19, 2019.
International Searching Authority, International Search Report, PCT/US2019/000043, dated Mar. 26, 2020.
International Searching Authority, Written Opinion of the International Searching Authority, PCT/US2019/000043, dated Mar. 26, 2020.
International Searching Authority, International Search Report, PCT/US2019/000013, dated Aug. 22, 2019.
International Searching Authority, Written Opinion of the International Searching Authority, PCT/US2019/000013, dated Aug. 22, 2019.
IP Australia, Examination Report No. 1, Australian Patent Application Serial No. 2019232570, dated Nov. 21, 2023.
Korean Intellectual Property Office, Office Action, Korean Patent Application Serial No. 10-2020-7029228, dated Dec. 15, 2023.
Korean Intellectual Property Office, Office Action, Korean Patent Application Serial No. 10-2020-7030512, dated Dec. 15, 2023.
Complaint by *Premiere Concrete Admixtures LLC* vs. *E5 Incorporated*, Case No. 3:24-cv-00654, U.S. District Court for the Northern District of Ohio, Western Division, filed Apr. 11, 2024, with all exhibits.
Trademark Assignment Cover Sheet and Patent and Trademark Assignment, dated Jan. 3, 2024, whereby Specification Products, Inc. assigned its rights in several patents and trademarks to E5 Incorporated, included in Exhibit 3 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Letter from William A. Mckenna of Woodard, Emhardt, Henry, Reeves & Wagner, LLP to Premiere Concrete Admixtures LLC, dated Apr. 3, 2024, included in Exhibit 4 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Request for Ex Parte Reexamination of U.S. Pat. No. 11,279,658 submitted to the U.S. Patent and Trademark Office, requested by Joseph W. Tucker, with all attachments and exhibits, requested on Jun. 1, 2023, included in Exhibit 5 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Order Granting Request for Ex Parte Reexamination from the U.S. Patent and Trademark Office, U.S. Pat. No. 11,279,658, Reexamination Control No. 90/015,243, dated Jun. 26, 2023, included in Exhibit 6 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Office Action in Ex Parte Reexamination from the U.S. Patent and Trademark Office, U.S. Pat. No. 11,279,658, Reexamination Control No. 90/015,243, dated Aug. 1, 2023, included in Exhibit 7 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Ex Parte Reexamination Certificate from the U.S. Patent and Trademark Office, U.S. Pat. No. 11,279,658 C1, Reexamination Control No. 90/015,243, issued Feb. 9, 2024, included in Exhibit 8 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Notice of Intent to Issue Ex Parte Reexamination Certificate from the U.S. Patent and Trademark Office, U.S. Pat. No. 11,279,658, Reexamination Control No. 90/015,243, dated Jan. 11, 2024, included in Exhibit 9 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
LinkedIn post by E5 Specification Products (7 yr ago) and Facebook post by E5 Nano Silica (dated Mar. 9, 2017), included in Exhibit 10 of *Premiere Concrete Admixtures LLC* vs. *E5 Incorporated*, Case No. 3:24-cv-00654, U.S. District Court for the Northern District of Ohio, Western Division, filed Apr. 11, 2024.
LinkedIn post by E5 Specification Products (7 yr ago) and Facebook post by E5 Nano Silica (dated Mar. 23, 2017), included in Exhibit 11 of Complaint by *Premiere Concrete Admixtures LLC* vs. *E5*

(56) References Cited

OTHER PUBLICATIONS

*Incorporated*, Case No. 3:24-cv-00654, U.S. District Court for the Northern District of Ohio, Western Division, filed Apr. 11, 2024.
TEAS Plus Trademark Application, U.S. Patent and Trademark Office, U.S. Trademark Application Serial No. 88/767,487, filed with the U.S. Patent and Trademark Office on Jan. 21, 2020, included in Exhibit 12 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
TEAS Plus Trademark Application, U.S. Patent and Trademark Office, U.S. Trademark Application Serial No. 90/153,767, filed with the U.S. Patent and Trademark Office on Sep. 2, 2020, included in Exhibit 13 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Response to Trademark Office Action, U.S. Trademark Application Serial No. 90/153,767, filed with the U.S. Patent and Trademark Office on Jun. 3, 2021, included in Exhibit 14 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Letter from Joseph W. Tucker of MacMillan, Sobanski & Todd, LLC to Mark Reichel of Reichel Stohry Dean LLP, dated Dec. 12, 2023, with exhibits, included in Exhibit 15 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Request for Continued Examination, Petition Under 37 CFR 1.78, and Petition to Expedite, with substitute specification, U.S. Appl. No. 18/114,214, filed with the U.S. Patent and Trademark Office on Dec. 13, 2023, included in Exhibit 16 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
E5 Nano Silica webpage image, undated, included in Exhibit 17 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
LinkedIn screenshot of E5(R) Nano Silica "About Us" page, https://www.linkedin.com/company/E5nanosilica, screenshot dated Feb. 8, 2024, included in Exhibit 18 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
E5 Nano Silica webpage image, undated, included in Exhibit 19 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
E5 Nano Silica webpage image, undated, included in Exhibit 20 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Response to Final Action in Ex Parte Reexamination, U.S. Pat. No. 11,279,658, Reexamination Control No. 90/015,243, dated Dec. 18, 2023, included in Exhibit 21 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Facebook post by E5 Nano Silica (dated Feb. 28, 2017), included in Exhibit 22 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Documentation referencing E5 Liquid Fly Ash and ElementFive, distributed by RussTech, Inc., included in Exhibit 23 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
"INDOT's use of Colloidal Silicas, National Concrete Consortium—Spring 2022," Michael Nelson, included in Exhibit 24 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
"Risk is the Problem." documentation, The Wayback Machine, available at https://web.archive.org/web/20160802145554/http://www.specificationproducts.com:80/new-slab-systems, included in Exhibit 25 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Graphical data, included in Exhibit 26 of Complaint by *Premiere Concrete Admixtures LLC* vs. *E5 Incorporated*, Case No. 3:24-cv-00654, U.S. District Court for the Northern District of Ohio, Western Division, filed Apr. 11, 2024.
Belkowitz, Jon S et al., "Colloidal Silica Admixture," Concrete International, Jul. 2014, pp. 59-65.
Bianchi, G. Quercia, "Application of nano-silica in concrete," PhD Thesis, Eindhoven University of Technology, 2014, available at https://pure.tue.nl/ws/portalfiles/portal/3793972/780551.pdf.
YouTube video and transcript of YouTube video, "Joe Shetterley on What is Element 5 and Concrete Patent Technologies," user "The Value Engineering Experts," available at https://www.youtube.com/watch?v=u0LHa_IQI-8, dated Feb. 24, 2022.
YouTube video and transcript of YouTube video, "Meyer Najem | E5," user "E5 Nano Silica," available at https://www.youtube.com/watch?v=35fpSzQSAMs, dated Apr. 7, 2020.
LinkedIn screenshot accessed Sep. 9, 2024, available at https://www.linkedin.com/posts/joe-shetterley_concrete-shotcrete-nanotechnology-activity-7067919962266374144-GufE/?utm_source=share&utm_medium=member_desktop.
LinkedIn screenshot accessed Sep. 9, 2024, available at https://www.linkedin.com/posts/bob-banka_spray-lock-concrete-protection-scp-technology-activity-7180665522479341568-XpLF/?utm_source=share&utm_medium=member_desktop.
Draft First Amended Complaint and Jury Demand by *Premiere Concrete Admixtures LLC* vs. *E5 Incorporated*, Case No. 3:24-cv-00654, U.S. District Court for the Northern District of Ohio, Western Division; provided to E5 Incorporated but not filed by Premiere Concrete Admixtures LLC in connection with said litigation.

\* cited by examiner

| | Cement Mix (lbs) | Coarse Agg(lbs) | Agg Vol (% vol) | Water (lbs) | Water/ Cement | Slump | Air (% vol) | 3 day (psi) | 7 day (psi) | 28 day (psi) | |
|---|---|---|---|---|---|---|---|---|---|---|---|
| 1 | 500 | Gravel 1,750. | 11. | 255 | 0.51 | 7.75 | 2. | 3,250. | 3,920. | 4,520. | Concrete Control |
| 2 | 500 | 1,750. | 11. | 255. | .51 | 7.5 | 2. | 3,810. | 4,590. | 5,050. | Concrete Control |
| 3 | 500 | 1,750. | 11. | 255 | 0.51 | 7.75 | 2. | 4,020. | 4,770. | 5,420. | Concrete Control |
| 4 | 500 | 1,750. | 11. | 255 | 0.51 | 7.5 | 1.9 | 4,220. | 4,990. | 5,910. | Concrete Control |
| 5 | 500 | 1,750. | 11. | 255 | 0.51 | 7.75 | 2. | 3,340. | 4,010. | 5,150. | 4oz/cwt before tail water;W/C=.51 |
| 6 | 500 | 1,750. | 11. | 255. | .51 | 7.5 | 2.1 | 3,750. | 4,450. | 5,420. | 4oz/cwt before tail water;W/C=.51 |
| 7 | 500 | 1,750. | 11. | 255 | 0.51 | 7.5 | 2.1 | 3,910. | 4,620. | 5,980. | 4oz/cwt after tail water; W/C=.51 |
| 8 | 500 | 1,750. | 11. | 255 | 0.51 | 7.5 | 1.8 | 4,290. | 5,200. | 6,420. | 4oz/cwt after tail water; W/C=.51 |
| 9 | 600. | 1,750. | 11. | 245. | .41 | 7. | 2.1 | 3,500. | 4,250. | 4,800. | 2 oz/cwt before tail water;W/C=.41 |
| 10 | 600. | 1,750. | 11. | 245. | .41 | 7.75 | 2.1 | 3,650. | 4,375. | 5,020. | 4 oz/cwt before tail water;W/C=.41 |
| 11 | 600. | 1,750. | 11. | 245. | .41 | 7.25 | 2. | 3,980. | 4,980. | 5,675. | 6 oz/cwt before tail water;W/C=.41 |
| 12 | 600. | 1,750. | 11. | 245. | .41 | 7.75 | 1.9 | 4,025. | 5,100. | 5,875. | 8 oz/cwt before tail water;W/C=.41 |
| 13 | 600. | 1,750. | 11. | 245. | .41 | 7. | 2.1 | 4,030. | 5,200. | 5,880. | 2 oz/cwt after tail water;W/C=.41 |
| 14 | 600. | 1,750. | 11. | 245. | .41 | 7.75 | 2.1 | 4,110. | 5,010. | 6,320. | 4 oz/cwt after tail water;W/C=.41 |
| 15 | 600. | 1,750. | 11. | 245. | .41 | 7.25 | 2. | 4,080. | 5,190. | 6,450. | 6 oz/cwt after tail water;W/C=.41 |
| 16 | 600. | 1,750. | 11. | 245. | .41 | 7.75 | 1.9 | 4,200. | 5,020. | 6,650. | 8 oz/cwt after tail water;W/C=.41 |

COMPOSITIONS FOR IMPROVED CONCRETE PERFORMANCE

PRIORITY AND RELATED APPLICATIONS

The present application is related to, claims the priority benefit of, and is a continuation patent application of, U.S. patent application Ser. No. 18/114,214, filed on Feb. 24, 2023 and issued as U.S. Pat. No. 11,919,823 on Mar. 5, 2024, which is related to, claims the priority benefit of, and is a continuation patent application of, U.S. patent application Ser. No. 16/501,311, filed on Mar. 22, 2019 and issued as U.S. Pat. No. 11,884,600 on Jul. 30, 2024, which is related to, and claims the priority benefit of, U.S. Provisional Patent Application Ser. No. 62/765,597, filed on Sep. 1, 2018, and U.S. Provisional Patent Application Ser. No. 62/761,393, filed on Mar. 22, 2018. The contents of each of the aforementioned patents and patent applications are incorporated herein directly and by reference in their entirety.

BACKGROUND

Concrete has been the basic element of construction since ancient times. Depending upon the type, concrete can have enough compressive strength to withstand the rigors of the elements and continuous public use with little structural degradation over time. Essential to its usefulness is the pourable rheology of water-containing mixtures of uncured concrete. Pourability of concrete enables structural shaping, such as for example, with a mold or other constraint, prior to curing into a hard form. Water functions in both the shaping and curing of concrete. However, heretofore, it has been necessary to carefully manage the water which gives rise to the pourability of concrete; too much or too little water in the concrete at any time during curing can negatively affect the concrete curing process, leading to a structurally compromised concrete product.

Water in curing concrete generally has three important functions. First, water is required for the hydration of the dry cement. The hydration reaction (curing) is the concrete-forming reaction (C-S-H forming reaction): water participates in a reaction by which the bonds are formed which give concrete its compressive strength. Theoretically, the concrete with the greatest compressive strength is formed when the hydration reaction goes to completion. In reality, the hydration reaction generally proceeds to a significant degree during the first stages of curing, but is limited at later times by evaporation of water from the surfaces of the curing concrete. Concrete hydration can be greatly affected by ambient conditions such as wind speed, relative humidity and temperature. Thus, concrete can "dry" even though it is only partially cured. If the concrete surface dries out prematurely, hydration can be incomplete, giving a surface that is both porous and weak. In order for concrete to reach its full-strength potential, it is generally required that water be in place continuously for extended periods of time, often for days. In practice, concrete is seldom cured to its full-strength potential.

A second function of water is to aid in pourability of concrete. Upon the addition of water to the cement, but before hydration takes place on a large-scale, much of the water that will ultimately participate in hydration is already associated with the additives and calcium hydroxide in the concrete. Water in excess of this associated water generally benefits flowability of concrete, with more "extra" water generally correlating with a greater flowability of the concrete.

In general, it is thought in the industry that even relatively small amount of such extra water is detrimental to the concrete product. Environmental conditions (wind, relative humidity and temperature) can cause the surface of the slab to dry faster than the interior. Internal water is often trapped interiorly. A degree of hydration begins with the addition of water to the cement, and shortly after pouring, hydration can be well underway. The trapped water can escape to the surface through capillaries formed by the relatively dried, partially cured surface. The trapped water may instead form reservoirs inside the curing concrete, resulting in voids in the cured concrete product. Both capillaries and reservoirs can compromise the compression strength of the resultant cured concrete. They also enable environmental water to enter the concrete during its lifetime of service, allowing the concrete to be degraded by freeze damage and other water-mediated damage processes.

Furthermore, it is thought that water that does not participate in hydration (i.e., water that does not combine chemically with the concrete) essentially adds volume to the poured concrete, and the loss of this water during drying generally results in some degree of shrinkage of the concrete during curing. Nevertheless, the concrete must be workable. Thus, the inclusion of the optimum amount of water such that hydration (curing) and workability are maximized, while shrinkage and structural damage to the concrete during hydration/drying is minimized remains a delicate balancing act, made all the more difficult by environmental factors.

A third function of water is to enable finishing of partially cured surfaces which may also be desiccated due to evaporation. Surfaces which dry prematurely are generally difficult to finish. It is a normal practice to add water to such surfaces to facilitate strike-off, closing and finishing. Added water can penetrate the surface, particularly when capillaries are present. Such water generally leaves the concrete slowly over an extended period, often even when the concrete appears dry. Often further steps, such as sealing or steps which require securing components such as floor tiles or carpeting to the floor are affected by the slow release of finishing water. For example, it is not unusual for adhesives to fail within a short time of floor installation due to the slow emission of water. This water is often primarily finishing water. Even when water is added, the finishing machines often must be operated at higher settings in order to effectively finish a surface which has partially dried.

The use of additional cementitious materials in concrete to improve concrete properties, such as, for example, water impermeability, compressive strength and abrasion resistance, is well-known. Various types of particulate silica, such as, for example silica fume, have been used in concrete as additional cementitious materials to improve water-impermeability and compressive strength. A general problem with silica is that it can raise the water demand of a concrete formulation such that the likelihood of capillaries and void formation during curing is increased due to the higher likelihood of significant bleedwater. In order to reduce bleed water, it is common in the art to use relatively large amounts of silica fume (5 to 10 percent by weight of cementitious materials), with water minimized or carefully rationed to relatively low amounts, such as, for example, below a ratio of about 0.5 by weight of water to cementitious materials. (*Design and Control of Concrete Mixtures*, Sixteenth Edition, Second Printing (revised); Kosmatka, Steven H.; pg.

156). Such low amounts of water are generally below what is recommended by the cement manufacturer, and can significantly impair the rheology of the concrete, causing it to be difficult to pour or work.

BRIEF DESCRIPTION

Surprisingly it has been found that the use, in poured concrete installations, of nanosilica (i.e., amorphous silica having particles with an average particle size of less than about 55 nm, and in some embodiments, less than about 7.8 nm, or, in other embodiments, between about 5 and about 55 nm, or between about 5 and about 7.9 nm; and having a surface area in the range of from about 300 to about 900 $m^2/g$, or in other embodiments, from about 450 to about 900 $m^2/g$, in amounts such that it is present in the concrete in a weight ratio in the range of from about 0.1 to about 4 ounces amorphous silica per 100 lbs of cement (i.e., not including water, aggregate, sand or other additives) can result in a significantly lower rate of water loss during curing than concrete which is hydrated in the absence of such amorphous silica. Thus, the surfaces of newly-poured, partially-cured concrete of the inventive method remain easily workable for longer periods than those of concrete prepared by other methods, and are less sensitive to environmental conditions which ordinarily speed evaporation. Bleedwater, curling, cracking and shrinkage are generally greatly reduced. Compressive strength of the resultant cured concrete is generally significantly increased. Remarkably, important to the realization of the benefits of the invention is the introduction of the silica to the concrete mix after the water and other dry components have been mixed such that the dry components are thoroughly wetted. The introduction of the silica at an earlier stage, such as prior to the wetting, generally does not give a significant reduction in bleedwater, cracking and shrinkage, and may in fact be worse in such aspects than non-silica controls. The foregoing holds true even if there is an improvement in compressive strength with respect to non-silica controls.

A concrete is disclosed which comprises small-particle-size, high-surface-area amorphous silica, used in much smaller proportions to the cement than generally used in the industry for structural purposes: only about 0.1 to about 4 ounces per hundred weight of cement mix ("cwt"). In an additional aspect, the improved concretes are prepared by a process-specific addition of the silica. These improved concretes can be prepared using the standard amount of water recommended by the cement manufacturer, or even water in excess of the recommended amount, without significantly compromising compressive strength. Such a result is truly surprising. Despite the use of such water amounts, little or no bleedwater is observed during curing. The formation of capillaries and voids is minimal or even essentially completely suppressed, and more water is retained in the concrete during curing, allowing more water to participate in curing over an extended period of time, and compressive strength, both early (3 day) and, particularly late (28 day) is greatly improved.

Despite their allowance for relatively high amounts of water, the low-silica concretes have improved compressive strength and abrasion resistance, among other improved characteristics. An improvement in compressive strength, is surprising, considering the small amounts of silica employed, while known methods use much larger amounts to achieve gains which are, in some cases, significantly less. Furthermore, large improvements in concrete abrasion resistance have generally not been observed with the use of silicas such as, for example, silica fume, even in the larger amounts usually used. (id, pg. 159). The low-silica concretes, described herein, give profound improvement in abrasion resistance as measured by test ASTM C944. (Note that with regard to the foregoing standard, the version employing a 22 pd, 98 kg load was used in all references to the standard herein.) Standard concretes (i.e., not comprising the high-surface-area amorphous silica taught infra) can have a value of in the range of from about 2.5 to about 4.0 grams of loss. The low-silica concretes taught herein can have an ASTM C944 value is as low as 1.1 grams of loss or less.

Even more remarkably, the specific steps of the process for mixing the components to form the cement mix are important for the realization of the increased water retention, compressive strength and workability of the newly-poured, partially-cured concrete surfaces. Essentially all of the amorphous silica is added after the combination of some or essentially all water and the dry ingredients (for example, cement mix, aggregate, sand), within a mixing machine, such as, for example, a Ready-mix to be used in the mixing stage (i.e., prior to the actual pour). By "essentially all of the water," it is meant that water which is part of the amorphous silica formulation, such as, for example, water involved in creating a colloidal suspension of the amorphous silica, generally being much less than the water added to the concrete mix, is not included within the meaning of "essentially all." It is particularly convenient to add the small particle-size silica after (or in some embodiments, with) a final portion of water (i.e., "tailwater") prior to final mixing and pouring. The breaking of water addition into two portions id particularly convenient with the use of a Ready-mix, in that the second portion can be used to rinse remnant dry components from near the mouth of the drum down into the bulk.

That small particle silica is more effective after tailwater addition is unexpected. The general thinking in the art is that the addition of silica to concrete has heretofore been thought generally effective even if it is added to the mix of cementitious materials prior to the addition of water. However, it has been found on the scale required for construction of building slabs, footings and other large scale concrete pours, such that mixing and pouring equipment such as Ready-mixes are used, the addition of the small amount of small-particle-size silica, as described herein, has been demonstrated, as indicated herein, to be much more effective when added after the quantity of water, or, in preferred embodiments, with or after a second portion of water ("tailwater") to concrete which has been wetted and, optionally, mixed for a period of time, as disclosed herein, than when it is added before the water, or with the portion of water used to wet the cementitious materials.

The amorphous silica is added after the water, cement mix and solids (aggregate and sand) are mixed, such as for example, with a Ready-mix or other mixer. The formation of capillaries and reservoirs can be reduced or eliminated. The benefits of the invention can generally be obtained even when the concrete mix contains significant amounts of water in excess of that required by the concrete in order to fully hydrate it (cement mixes generally have a recommended amount of water to give the concrete which can be fully hydrated according to the manufacturer specification). Concrete having water equal to, or even in excess of the amount required for full hydration, or recommended by the cement mix manufacturer, are preferred.

While silica of larger sizes has been shown to improve compressive strength of concrete, it is well-known that silica has a water requirement and as size is decreased and surface area is increased, the amount of water required by the concrete increases. Thus, the perception in the art is that there is a tension between 1) decreasing silica particle size and 2) keeping water content low enough such that the formation of capillaries and voids are minimized. Thus, it is thought that at small particle sizes, a risk exists that the water requirement would override the structural benefits provided by silica. Illustrating this fact, the applicants have found that if the prescribed amorphous silica is added to the cement or concrete mix at other points in the preparation of the pourable concrete mixture, such as, for example, at any time prior to relatively complete mixing of water and cement mix (before or with the water which wets the cement mix, the resulting poured concrete can exhibit significantly more capillaries, voids and/or resulting surface bleed water than if the amorphous silica is added after complete mixing of the water and cement mix. Thus, it is truly surprising that if the silica is added, (preferably as amorphous colloidal silica or precipitated silica) at a point after the cement and water have been completely mixed, the formation of capillaries and voids is reduced or eliminated, water evaporation is slowed, and newly-poured, partially-cured surfaces are generally easily worked, often without the addition of finishing water. In general, it would be expected that some degree of benefit can be observed when the silica is added after the water even if complete mixing of the water and cement mix has not taken place.

The success of delayed addition of nanosilica is particularly surprising in light of what has been discovered about how factors such as nanosilica particle size and surface area affect concrete properties, most notably compressive strength, when introduced as colloidal silica into concrete-forming mixtures. A summary of some findings in the art, the most recent findings of which the inventors only become aware after their own experimentation, is as follows. The use of colloidal nanosilica (silica having average particle sizes of less than about 100 nm, and particularly silica having average particle sizes of less than about 10-15 nm) in concrete-forming mixtures has been fraught with issues pertaining to compressive strength, among other properties, of the resulting concrete. For example, past studies have shown that larger particle-size silica, such as, for example, silica fume (about 145 nm) generally has a positive effect upon compressive strength in a wide range of particle sizes and loadings. However, smaller silica particles have a much more complicated correlation with compressive strength. Recent studies have shown that nanosilica particles tend to agglomerate in colloidal solutions. (Non-nano-sized silica particles, such as, for example, silica fume, have larger surface potentials, and are much less inclined to agglomerate.) The studies further show that such agglomerates, when introduced into concrete-forming mixtures and not subsequently sufficiently dispersed, such as, for example, by agitation, can become spaces in the final concrete product which are devoid of concrete matrix structure, negatively affecting compressive strength and other properties. However, the studies also show that the extensive surface area afforded by nanosilica for pozzolanic reaction, being much greater (by more than one order of magnitude, often several) than that of non-nano-sized silica, causes the C-S-H matrix-forming reaction to experience competition from reactions at the silica surface. As a result, the availability of a large amount of surface area can result in a weaker C-S-H matrix, resulting in lower compressive strength. Thus, in the search for nanosilica loading parameters which increase compressive strength, there can be a tension between 1) the persistence of aggregates in the concrete-forming mixture, and 2) agitation of the concrete-forming mixture or the application of other modes of dispersion, such that the aggregates are reduced or eliminated, but resulting in a surge in the amount of exposed silica surface area.

Setbacks were encountered in the inventor's attempts to use nanosilica in the field. It was found that silica loadings which clearly produce compressive strength gains in the lab when prepared by standard procedures such as ASTM 305-06 often failed to give compressive strength gains when used in standard fashion in a larger-scale process subject to the preparation constraints of an industrial pour, e.g. a Readymix process. Furthermore the concrete was often rheologically compromised, having poor pourability, as well as often exhibiting greater bleedwater, cracking, curing and shrinkage than a silica-free control.

Such a procedural dependence for the same loading levels of nanosilica could be considered unexpected because the apparent differences are in scale, as well as increased time to complete component mixing associated with the Readymix. One of skill in the art may not expect the processes which affect compressive strength to occur on the relatively brief timescale involved in the initial mixing of the concrete components, such that the differences in mixing times would affect compressive strength. This is especially true given that test cylinders are taken at pour time; i.e., differences in measured compressive strength could be argued to be not even partially attributable to larger bulk size of slab vs. size of sample.

Furthermore, upon extensive experimentation, the addition of the silica late in the mixing process as described infra was found to restore the compressive strength-boosting effect of nanosilica. This was an unexpected result because much, if not almost all of the mixing agitation has taken place by the time the nanosilica is finally added. Thus, any aggregates are less likely to be completely dissipated into the concrete mix, and would theoretically weaken the concrete as described above. In general, it has been found that on a construction scale, adding the colloidal nanosilica after the addition of water gives a concrete mixture which is more pourable and a concrete product which of increased compressive strength, pourability, and wear resistance; as well as decreased cracking, curling and shrinking with respect to standard addition samples and silica-free control samples.

BRIEF DESCRIPTION OF THE DRAWINGS

FIG. 1 is a summary of experimental results taken in accordance with the procedure described in Example 3 and referred to in the analysis presented therein.

DETAILED DESCRIPTION

A concrete mix is created from components comprising quantities of a) a dry cement mix; b) water; c) amorphous silica; and d) aggregate and or sand.

Dry cement mixes generally have a recommended water content which gives a water/cement ratio providing a concrete mix which has a combination of desirable pouring and curing characteristics. In some cases, the recommended water content encompasses a range of water contents. As indicated infra, the initial water content of concrete mix prior to pouring can give rise to issues during curing and finishing which reduce the quality of the resulting concrete installation (slab, footing, etc.). It is common for water-reducing measures, such as the use of "water-reducers" and superplasticizers to be employed in the interests of reducing water-mediated structural flaws in the cured concrete. It should be noted that while the benefits of the present invention should be evident in circumstances in which the water content is being reduced below that recommended by the manufacturer, the present invention can be used to give the inventive concrete in situations in which the water included in the concrete mix is equal to or greater than the amount specified by the manufacturer of the dry cement mix. Water-reducers in the concrete mix are generally unnecessary.

Thus, in a broad aspect, the cement mix and the water are present in the concrete mix are present in the mix in the following proportions:

A quantity of water; and a quantity of dry cement mix, said cement mix characterized by:
i) a manufacturer suggested water/cement ratio value; wherein said suggested ratio falls in the range of from about 0.35 to about 0.65; and whereupon combination with the quantity of water, the water/cement ratio is greater than the value corresponding to about 10% less than the suggested value but less than the value corresponding to about 30% more than the suggested value; or
ii) a manufacturer suggested water/cement ratio range, having an upper value and a lower value, and whereupon combination with the quantity of water, the water/cement ratio is greater than the value corresponding to about 10% less than the lower value and not greater than the value corresponding to about 30% more than the upper value; or
iii) an amount such that, whereupon combination with the quantity of water, the water/cement ratio is in the range of from about 0.35 to 0.65;

The benefits of the invention are generally expected to be manifest with the use of commercially useful types of Portland cement. The cement mix is one or more of the types commonly used in construction, such as, for example, Portland cements of Types I, II, III, IV and V.

The quantity of water above is added to the cement mix. This quantity is inclusive of all water which is combined with the concrete mix comprising at least the cement mix, except water introduced with the silica in the case of water-containing formulations such as colloids, dispersions, emulsions, and the like. As further detailed below, the water can be combined with the concrete mix comprising at least the cement mix in multiple portions, such as, for example, the addition of a second portion of water (for example, "tailwater") after a first portion of water has been combined with the concrete mix and agitated for a time. Note that water is sometimes applied to the surface of concrete after it has partially cured, to prevent the premature drying of the surface, which could result in shrinkage, as well as later difficulties in working and finishing. This "finishing" water is not included within the quantity of water. In other embodiments, the water/cement ratio is in the range of from about 0.38 to 0.55, or, in more specific embodiments, in the range of from about 0.48 to about 0.52, or in the range of from about 0.38 to about 0.42.

In a more preferred embodiment, in reference to i), ii), and iii), above, the water and cement mix are present in the concrete mix in the proportions wherein upon combination of the quantity of dry cement mix with the quantity of water, the water/cement ratio is:

equal to or greater than the suggested value, but not greater than the value corresponding to 30% more than the suggested value; or equal to or greater than the upper value of the suggested range, but not greater than the value corresponding to about 30% more than the upper value; or at least 0.35, but not greater than 0.65.

Particle size of amorphous silica is particularly important. Larger particle sizes, such as will be found in micronized silica, generally do not reduce the formation of capillaries and voids to the degree seen when amorphous silica sized as prescribed herein is used in the prescribed amounts. The inventive concrete mix comprises a quantity of amorphous nanosilica, which is preferably present in an amount in the range of from about 0.1 to about 7.0 ounces per hundredweight of cement (cwt) in a), and having particle sizes such that the average silica particle size is in the range of from about 1 to about 55 nanometers, and/or wherein the surface area of the silica particles is in the range of from about 300 to about 900 $m^2/g$, or in other embodiments, from about 450 to about 900 $m^2/g$.

Amorphous silica from various sources is generally suitable as long as it is characterizable by the particle size and surface area parameters above. Nonlimiting examples of suitable amorphous silica include colloidal silica, precipitated silica, silica gel and fumed silica. However, colloidal amorphous silica and silica gel are preferred, and colloidal amorphous silica is most preferred.

In further embodiments, the silica particle size is in the range of from about 5 to about 55 nm. Preferred are particles with average particle size of less than about 25 nm, with average particle size of less than about 10 nm more preferred, and average particle size of less than about 7.9 nm even more preferred. A preferred weight proportion in the concrete is from about 0.1 to about 3 ounces of amorphous silica per 100 lbs of cement (not including water, aggregate, sand or other additives). A more preferred weight proportion in the concrete is from about 0.1 to about 1 ounces of amorphous silica per 100 lbs of cement (again, not including water, aggregate, sand or other additives). Even more preferred is about 0.45 to about 0.75 ounces of amorphous silica per 100 lbs of cement (again, not including water, aggregate, sand or other additives). Surprisingly, above about 3 to about 4 ounces of the amorphous nanosilica per 100 lbs cement mix, the concrete mix can become difficult to pour or work, and compressive strength can suffer greatly, even with respect to non-silica controls. Otherwise, amounts above about 1 ounce per 100 lbs cement generally give decreasing compressive strength gains with respect to the preferred range of about 0.45 to about 0.75 ounces of amorphous silica per 100 lbs cement. The preferred range given is the most economically feasible range, i.e., above that, the compressive strength gains are less per additional unit of silica, and cost of silica per unit increase of compressive strength may cause the cost of the concrete to become prohibitive.

Amorphous silicas having surface areas in the range of from about 50 to about 900 $m^2/gram$ are preferred, with about 150 to about 900 $m^2/gram$ more preferred, and about 400 to about 900 $m^2/gram$ even more preferred, and 450-700 $m^2/gram$ or 500-600 $m^2/gram$ even more preferred. Amorphous silica with an alkaline pH (about pH 7 and above) is preferred, with a pH in the range of from 8 to 11 being more preferred.

In yet another embodiment, the amorphous silica is provided by the use of E5 INTERNAL CURE, an additive available commercially from Specification Products LLC, which contains about 15 wt % amorphous silica in about 85 wt % water. The silica particle characteristics are an average particle size of less than about 10 nm (measured by BET method), and a surface area of about 550 $m^2/g$. In one embodiment, the weight proportion of E5 INTERNAL CURE to cement is in the range of from about 1 to about 20 ounce of E5 INTERNAL CURE to 100 lb cement (not including water, sand, aggregate or other additives). More preferably the weight proportion of E5 INTERNAL CURE to cement is in the range of from about 1 to about 10 ounces of E5 INTERNAL CURE to about 100 lb cement (not including water, sand, aggregate or other additives). A more preferred weight proportion of E5 INTERNAL CURE to cement is in the range of from about 1 to about 5 ounces of E5 INTERNAL CURE to about 100 lb cement, with about 3 to about 5 ounces of E5 INTERNAL CURE to about 100 lb cement (not including water, sand, aggregate, or other additives) even more preferred. Surprisingly, the use of more than about 20 ounces of E5 to about 100 lb cement (again, not including water sand, aggregate or other additives) can cease to be of benefit in that additional beneficial water or compressive strength benefits may not be observed or may be minimally observed. The resulting concrete mix may be difficult to pour, and any resulting concrete may be of poor quality. Note that the quality of the concrete diminishes with the distance from the preferred range of about 3 to about 5 ounces per 100 lb cement, but the compressive strength may still be improved over that in the absence of the E5 INTERNAL CURE colloidal amorphous silica. In preferred embodiments the water added to the concrete mix is in the range of from about 40 to about 98 wt % water, with 60 to 95 wt % preferred and 70 to 92 wt % more preferred, and 75 to 90 wt % even more preferred, with about 50 to about 95 wt % water within said range, so about 5 to about 50 wt % silica present within the amorphous nanosilica suspension, and with about 75 to about 90 wt % water within said range, so about 10 to about 25 wt % silica present within the amorphous nanosilica suspension.

Aggregate and sand can generally be used in the inventive concrete in amounts as known in the art for construction purposes. In one embodiment, a quantity of aggregate and/or a quantity of sand is used such that they total an amount in the range of from about 400 to about 700 wt % bwoc. In general, a concrete mix is prepared with components comprising cement mix, water, and, preferably, a quantity of aggregate and sand (sometimes referred to in the art as "large aggregate" and "small aggregate," respectively). It is permissible for the concrete mix to comprise only one of the two, such as only sand or only aggregate, but it is preferred the mix comprise at least a quantity of each. Sand and aggregate can contribute to the silica content of the cement mixture, and thus they can affect (i.e., raise somewhat) the water requirement of the concrete mix. Generally, most types of aggregate which are appropriate for the use to which the concrete is to be put can be used. Included are larger aggregates such as coarse, crushed limestone gravel, larger grades of crushed clean stone, and the like, as well as smaller aggregates such as the smaller grades of crushed clean stone, fine limestone gravel, and the like. Likewise, many types of sand, such as pit (coarse) sand, river sand and the like can be used. Generally, in concrete applications, "coarse sand" is preferred to "soft sand," which is known to be more appropriate for use in mortars. However, soft sand may generally be expected to have a different water requirement than coarse sand when used in concrete preparation. As is known in the art, weight-bearing applications may require larger aggregate, such as coarse, crushed limestone. Such larger aggregate is preferred for poured concrete applications, particularly for use in poured building slabs are the larger aggregates, such as, for example, coarse crushed limestone gravel and larger grades of crushed clean stone, and pit sand.

The proportion of aggregate and sand, taken together, based on weight of cement (bwoc) is preferably in the range of from about 2000 to about 4000 lbs per yard of dry cement mix (in the range of from about 520 to about 610 lbs per yard, or more preferably from about 560 to about 570 lbs per yard, even more preferably, about 564 lbs per yard). More preferred is a combined proportion of aggregate and sand in the range of from about 2700 to about 3300 lbs per yard of dry cement mix. More preferred is a range of from about 2900 to about 3100 lbs per yard of dry cement mix. In another embodiment, the weight of aggregate and sand is between 50 and 90 wt % based upon the weight of the concrete, with a range of from about 70 to about 85 wt % preferred. The relative amounts of aggregate and sand are not critical, but are preferably in the range of from about 20 wt % to about 70 wt % sand based upon the combined weight of the sand and aggregate, with about 40 wt % to about 50 wt % sand preferred.

It has been discovered, especially in commercial scale pours, that even the small amounts of amorphous nanosilica required to effect the disclosed benefits, when added to the cement mix prior to the water, can be detrimental to the pourability of the concrete mix, as well as the quality of the resultant concrete, even rendering the concrete unsuitable. The process of the present invention generally includes the situation in which at least a portion of the quantity of water is added prior to the addition of the quantity of amorphous nanosilica, with at least a time period of agitation between the additions to distribute the water prior to the addition of the amorphous silica. In practice, some water may be added later in the preparation process, if desired. For example, it is known to add water in two (or more) portions, such as the practice of adding a portion as "tailwater" after the addition and agitation of a first portion. In one embodiment, the amorphous silica is added as a colloidal silica with a second portion of water. In a preferred embodiment, the colloidal silica is added after the addition of water which has been added in two portions, with agitation after the addition of each portion.

Thus, more generally, the quantity of water can be added in its entirety or added in portions comprising an initial portion, comprising in the range of from about 20 wt % to about 95 wt % of the quantity of water, and a tailwater portion, comprising the remainder; wherein the initial portion of water is combined with the quantity of cement mix and the aggregate/sand components to form a first mix; and wherein the amorphous silica is added to a mix comprising the quantity of cement mix, the aggregate/sand components and the initial portion of water to form a second mix. Even more preferred is an initial portion comprising in the range 35 to about 60 wt % of the quantity of water.

(The below three situations (i.e., "situation 1", "situation 2" and "situation 3") correspond, respectively to i) the addition of the silica after the addition of the tailwater; ii) the addition of the silica before the addition of the tailwater; and iii) the co-addition of the silica with the tailwater.)

In embodiments with split water addition, wherein the tailwater is 1) added to the first mix; or 2) added to the second mix; or 3) co-added with the amorphous silica to the first mix, wherein the amorphous silica and the tailwater are, optionally, intercombined; and wherein 1) the first mix is agitated for a time $t_{11}$ prior to the addition of the tailwater, for a time $t_{12}$ after the addition of the tailwater but before the addition of the amorphous silica, and for a time $t_{13}$ after the addition of the amorphous silica; or 2) the second mix is agitated for a time $t_{21}$ prior to the addition of the amorphous silica, for a time $t_{22}$ after the addition of the amorphous silica but before the addition of the tailwater, and for a time $t_{23}$ after the addition of the tailwater; or 3) the second mix is agitated for a time $t_{31}$ prior to co-addition of the amorphous silica and the tailwater, and whereupon the concrete mix is then agitated for a time $t_{32}$.

In situation 1), in which the second portion of water (tailwater) is added to a concrete mix comprising a first portion of water, the quantity of cement mix and the sand/aggregate components, $t_{11}$ is preferably in the range of from about 2 to about 8 minutes, with about 3 to about 6 minutes more preferred, and at a mixing speed (such as for example, in a Ready-mix) preferably in the range of from about 2 to about 5 rpm. Time $t_{12}$ is preferably in the range of from about 0.5 to about 4 minutes, with a more preferred range of from about 1 to 2 minutes, at a mixing speed in the range of from about 2 to about 5 rpm. Time $t_{13}$ is preferably in the range of from about 2 to about 10 minutes, with a range of from about 5 to about 10 minutes more preferred, with a relatively high mixing speed at a rate in the range of from about 12 to about 15 rpm. After the high rate mixing, the rate can be lowered to a rate in the range of from about 2 to about 5 rpm for a time, such as, for example, a transit time to a pour site. Transit time standards are set by the American Concrete Institute. For example, the concrete must be poured within 60 minutes of the end of high-rate mixing if the temperature is 90 F. or greater, and within 90 minutes if the temperature is less than 90 F.

In situation 2), in which the second portion of water (tailwater) is added to a concrete mix comprising a first portion of water, the quantity of cement mix and the sand/aggregate components, and the amorphous silica, $t_{21}$ is preferably in the range of from about 2 to about 8 minutes, with about 3 to about 6 minutes more preferred, and at a mixing speed (such as for example, in a Ready-mix) preferably in the range of from about 2 to about 5 rpm. Time $t_{22}$ is preferably in the range of from about 0.5 to about 2 minutes, with a more preferred range of from about 0.5 to 1 minutes, at a mixing speed in the range of from about 2 to about 5 rpm. Time $t_{23}$ is preferably in the range of from about 2 to about 10 minutes, with a range of from about 5 to about 10 minutes more preferred, with a relatively high mixing speed at a rate in the range of from about 12 to about 15 rpm. After the high rate mixing, the rate can be lowered to a rate in the range of from about 2 to about 5 rpm for a time, such as, for example, a transit time to a pour site. As noted above, transit time standards are set by the American Concrete Institute.

In situation 3), in which the tail water is co-added with the amorphous silica to the first mix, wherein the amorphous silica and the tailwater are, optionally, intercombined, $t_{31}$ is preferably in the range of from about 2 to about 8 minutes, with about 3 to about 6 minutes more preferred, and at a mixing speed (such as for example, in a Ready-mix) preferably in the range of from about 2 to about 5 rpm. Time $t_{32}$ is preferably in the range of from about 2 to about 10 minutes, with a range of from about 5 to about 10 minutes more preferred, with a relatively high mixing speed at a rate in the range of from about 12 to about 15 rpm. After the high rate mixing, the rate can be lowered to a rate in the range of from about 2 to about 5 rpm for a time, such as, for example, a transit time to a pour site. As noted above, transit time standards are set by the American Concrete institute.

In another embodiment, the entire quantity of water is added to the quantity of cement mix and the aggregate/sand components to form a mix, whereupon said mix is agitated for a time $t_a$ prior to the addition of the amorphous silica, whereupon the concrete mix is then agitated for a time $t_b$ prior to pouring. The addition of the entire quantity of water at once is useful in the case of wet batch processes. Time $t_a$ is preferably in the range of from about 2 to about 8 minutes, with about 3 to about 6 minutes more preferred, and at a mixing speed (such as for example, in a Ready-mix) preferably in the range of from about 2 to about 5 rpm. Time to is preferably in the range of from about 2 to about 10 minutes, with a range of from about 5 to about 10 minutes more preferred, with a relatively high mixing speed at a rate in the range of from about 12 to about 15 rpm. After the high rate mixing, the rate can be lowered to a rate in the range of from about 2 to about 5 rpm for a time, such as, for example, a transit time to a pour site. As noted above, transit time standards are set by the American Concrete Institute. While benefits of the invention would generally be observed in the case of a single addition of water, in practice, the two-portion division of water is generally adhered to. After the agitation of a concrete mix comprising a first portion, the use of a second portion has the advantage of washing down into the Ready-mix remnants of insufficiently mixed cement mix from near the mouth of the barrel.

The concrete mixture can be prepared in a wet ("central mix") or dry ("transit mix") batch situation. In wet batch mode, the dry components are mixed with the quantity of water followed by the amorphous silica to give a concrete mix, in one of the ways indicated above. The mix is agitated as above or introduced into a Ready-mix and agitated therein as indicated above. Essentially, the wet and dry batch situations are similar except that part of the procedure for a wet batch is performed outside of the Ready-mix (for example, at the plant). Dry batching ("transit mix") is somewhat preferred. For example, 40 plus or minus 20%, or, in further embodiments, plus or minus 10% of the total quantity of water to be utilized in the preparation of the concrete mix, sand and coarse aggregate used in the batch is loaded into a Ready-mix. The cement mix, coarse aggregate and sand are mixed together and loaded into the Ready-mix. The remaining water is then loaded into the Ready-mix. Once the dry components and the water are completely mixed, the amorphous silica is added, and the mixture is mixed for 5 to 10 minutes. The mixing preferably takes place at relatively high drum rotation speeds, such as, for example, a speed in the range of from about 12 to about 15 rpm. Once the higher-speed mixing has occurred, the batch can then be poured. However, it is permissible to have a period of time between the higher-speed mixing and pouring, such as transport time to the pouring site. In general, as long as the concrete is mixed at lower speeds, such as, for example, about 3 to about 5 rpm, a time between the high-speed mixing and the pouring of in the range of from about 1 to about 60 minutes is permissible.

In one embodiment, it is particularly convenient to add the silica to a Ready-mix, which contains the water, cement and other dry components, once the Ready-mix has arrived at the pour site. It has further been found that after the amorphous silica has been added, the concrete/silica mixture should be mixed, prior to pouring, for a time, most preferably at least from about 5 to about 10 minutes. However, other periods of time may be permissible with respect to at least partially obtaining the benefits of the invention.

The benefits of the invention can be expected in commercially used variants of the foregoing process, as long as the amorphous silica is added at the end, after the mixing together of the dry components and the first and second portion of water (or with the second portion of water), and the silica-added mixture is mixed for a time as specified herein prior to pouring.

The concrete mix is then poured to form a concrete installation. In a preferred embodiment, the concrete mix is formed and agitated in the context of an industrial scale pour, such as the preparation of footings or slabs. In an additional embodiment, the concrete mix is created with and within equipment which holds the mix as it is being created, and which also has the capacity to agitate the mix, such as, for example, a Ready-mix.

One advantage of the present inventive process is that water in concrete formation, such as for example, a slab, formulated according to the present invention, appears to be immobilized in the formation rather than lost to evaporation. The likely fate of much of this water is to participate in hydration at extended periods of time rather than form capillaries and voids. Thus, it is expected that, regardless of thickness, concrete slabs, walls and other formations will display a reduction or lack of voids and capillaries, and a correlative gain in compressive strength. Concrete formation having improved structure and compressive strength with thicknesses up to about 20 feet can be formed with the concrete of the present invention.

An advantage of the present inventive process is that poured concrete are less damaged by drying caused by environmental conditions, such as temperature, relative humidity and air motion such as wind. For example, concrete of good quality can be produced at wind speeds as high as 50 mph, temperatures as high as 120° F. and as low as 10° F., and relative humidities as low as 5% and as high as 85% or even higher.

The compressive strength of the concrete formed by the method of the present invention is generally increased with respect to concrete formed by methods which are similar or, preferably, the same save for the addition of silica after the mixing of the water, cement mix and filler materials (aggregate, sand and the like). "Similar" or "the same" applies to environmental conditions such as wind speed, relative humidity and temperature profile, as well as other environmental factors, such as shading or heat radiating surroundings with respect to the assessment of increase in compressive strength. Factors within the pourer's control, such as mixing times and parameters, pouring parameters (i.e., slab dimensions) are more easily accounted for. An increase in compressive strength is preferably assessed from pours which are identical except for the addition of the amorphous silica. In a preferred embodiment, the assessment is made from pours which are prepared from identical amounts of identical ingredients, simultaneously but in separate Ready-mixes, poured side-by-side, at the same time, but using separate Ready-mixes. Such pours are "substantially identical."

The increase in compressive strength can be in the range of from about 5 to about 40% or even more, based upon the compressive strength of the non-silica-containing pour of a pair of substantially identical pours. In more commonly observed embodiments, the compressive strength increase as assessed through substantially identical pours is in the range of from about 10 to about 30%.

The concrete of the present invention can generally be used in applications which require poured concrete, such as, for example, slabs, footings, and the like. An advantage of the present invention is that the concrete prepared therefrom is generally of increased resistance to water penetration, and can thus be used in poured applications which are particularly prone to moisture exposure and the associated damage, such as footings.

As indicated infra, the present invention involves the discovery that nanosilica, when added to a concrete mix, preferably as a colloidal silica, after the addition of at least a portion of water, gives a cement having an improved compressive strength among other improved properties, such as abrasion resistance and water permeability.

The additive concrete components such as sand and aggregates of sizes which are used in the art can generally be used in the concrete of the present invention without destroying the benefits provided by the present invention.

Thus, it is possible to utilize a concrete, comprising of ample water for hydration, pouring and working, in the preparation of concrete which generally lacks the deficiencies otherwise associated with concrete from concrete having high amounts of water of transport. The inventive compositions result in concrete which retains water such that exposed surfaces are less likely to dry prematurely than concrete which have not had amorphous silica added. The relative water retention effect is observed even in ambient conditions under which the surface would ordinarily be predisposed to desiccate. Concrete can thus be poured under a broader range of environmental conditions than standard concrete. Surfaces can thus be finished with reduced amounts of surface water, or even, in some cases, without adding surface water.

Remarkably, shrinkage is reduced with respect to concrete containing comparable amounts of water. More remarkably, the compressive strength is increased. This result is generally obtained even though the concrete contains amounts of water of transport that would risk capillary and void formation in absence of amorphous silica.

Without desiring to be bound by theory, it is surmised that the amorphous silica may immobilize the water during curing such that the water is prevented from migrating, retarding evaporation as well as capillary and void formation. Surprisingly, the immobilization does not prevent the water from participating in long term, extended hydration, which gives the unexpected increase in compressive strength.

An overarching benefit of the present invention is the ability not to use excess water in the curing reaction (hydration) due to generally losing the water to evaporation. Such a benefit can be obtained even in the case of concrete which are poured having water levels which are less than theoretically required for full hydration of the concrete, as well as at water levels which are in excess of that theoretically required for hydration.

A problem with existing concrete preparation and pour processes is the risk taken when a pour is done in less than optimum conditions. As indicated infra, relative humidity, wind speed and temperature, among other environmental factors, routinely compromise standard pours because of their effect on the water levels at various locations on and within the concrete. This can occur even when the amount of water included complies with the recommended amount of water specified by the cement mix manufacturer, whether it is a recommended range of values or a single specified optimum value. The present invention enables the operation at the cement manufacturer's suggested water contents with a reduced risk of water-related issues. These suggested values generally correspond to the amount of water which would be required to enable the hydration reaction to proceed to an acceptable degree, or in some cases, to completion. In the practice of this invention, use of water in the amounts specified by the cement manufacturer is preferred. However, the present invention also reduces the risk of water issues with respect to other processes even when the water content deviates from that specified by the manufacturer. Thus, in some embodiments, the water content is within the range of from about −30% of the lowest value specified by the manufacturer specifications and +30% of the greatest value specified by the manufacturer specifications, based upon the weight of the water added to the cement before the addition of the colloidal amorphous or other silica described herein.

Yet another benefit of the present invention follows from the ability of formulations thereof to retain water for the benefit of extended hydration without the formation of capillaries and void reservoirs. It is known in the art that the addition of aggregate, sand and other commonly included bulking and strengthening materials to cement to form concrete generally require additional water to accommodate them in the concrete and can actually promote the formation of capillaries and, especially, void reservoirs. Such reservoirs are associated with and located in relation to the surfaces of the included materials. In general, the most preferred aggregates and materials are of a quality such that they associate closely with the concrete over their surface areas such that during hydration, reservoir formation is minimized, as is the associated loss of compressive strength. However, such high quality included materials are generally uneconomical. Surprisingly, even in the presence of aggregates, the inclusion of amorphous silica particles can reduce or prevent the formation of void reservoirs and capillaries. Without desiring to be bound by theory, the reduction of such imperfections, particularly void reservoirs, and the associated increase in compressive strength, tends to indicate that the high surface area amorphous silica particles are participating in a direct association with the included material, regardless of material suboptimal quality. This association may exclude water and strengthen the attachment of the concrete to the included material.

Yet another benefit of the present invention is that concrete formulations prepared thereof can be pourable and/or workable without the use of so-called "superplasticizers". Non-limiting examples of such superplasticizers include ligninsulfonate, sulfonated naphthalene formaldehyde polycondensates, sulfonated melamine formaldehyde polycondensates, polycarboxylate ethers and other superplasticizer components whether they are emulsions, dispersions, powders or other chemical forms. In one embodiment, the concrete formulations of the present invention are pourable without the inclusion of superplasticizers and are superplasticizer-free or essentially superplasticizer-free. By "essentially superplasticizer-free", it is meant that the superplasticizer content is in trace amounts of less than about 0.1% based upon the weight of the cement.

Below is a non-limiting list of admixtures which can be used with the present invention. Alternatively, the concrete mixture of the present invention can be free of any or all of the below additives, or of other additives. The list below is ordered as per ASTM C 494 categories. Included are admixtures that are certified and not certified by ASTM C-494.

Admixtures can be added as a powder or liquid.
Normal water reducers and retarders (Type A, B, D)
Nominal dosage range: 0.5-6 OZ/C
Super-Plasticizers: Normal setting and retarding (Type F, G)
Nominal dosage range: 2-40 OZ/C
Accelerating Admixtures: water-reducing or non-water-reducing (Type C, E)
Nominal dosage range: 2-45 OZ/C
Type S admixtures as defined in ASTM C 494:
Mid-Range water-reducers and retarders
Nominal dosage range: 2-45 OZ/C
Corrosion inhibitors
Nominal dosage range: 0.25-5 GAL/YD
MVRA (Moisture vapor-reducing admixtures)
Nominal dosage range: 5-24 OZ/C
SRA (Shrinkage-reducing admixtures)
Nominal dosage range: 0.25-5 GAL/YD
Hydration stabilizers
Nominal dosage range: 0.5-24 OZ/C
Viscosity modifiers
Nominal dosage range: 0.25-8 OZ/C
Air-entraining admixtures;
Nominal dosage range: OZ as needed to entrain air: 0.1-36 OZ/C
Color agents; Liquid and solid
Nominal dosage range: 0.1-20 LB/YD Example 1

Location: Shelbyville, Ind. at the Shelby Materials ready-mix plant.

Environmental Conditions: The start time of the pour was 07:30 AM with a starting temperature of approximately 60° F. The ambient temperature peaked in the high 80's during the day. The relative humidity ranged from 18% to 67%. The wind speed range was from 3 to 13 mph.

Steps and Results:

1—A traditional class A concrete design of 6 bags (564 lbs) cement to 31 gallons of water (SSD—Saturated Surface Dry) per cubic yard (9 yards total) was used to place a 4-inch thick interior concrete slab with a non-air-entrained concrete. Roughly 12 gallons of water per cubic yard was added to the Ready-mix, followed by the dry cement mix (564 lbs per yard) as well as the aggregate and sand (1250 lbs of sand, and 1750 lbs of Stone per yard). The water and dry components were mixed for 1-2 minutes, and roughly 19 gallons of additional water per yard was then added to the Ready-mix. The mixture was mixed (in a concrete drum that has a high speed of 12-15 rpm for mixing of the concrete) for an additional time of 5-10 Minutes. When the driver was ready to transport the concrete to the job location he then slowed the concrete barrel to 3-5 rpm.

2—380.7 total ounces of E5 INTERNAL CURE (7.5 ounce/100 lbs cement) were then added after the 9 yards loaded and batched. Again, there were 564 lbs cement and 31 gallons of water per cubic yard.

3—The team allowed the ready-mix driver to mix the batch for 5 minutes at 12-15 rpm.

4—The ready-mix was then slowed to 2-5 rpm and driven 15 minutes to the job site. The concrete was then poured into the slab forms. The slab located against a metal building.

5—The traditional finishing process took place. After the pour, the slab was leveled. A bull float was then used to close the surface. Once the surface is hard enough to begin the mechanical finishing process appropriate methods used widely in the art were used to complete the finishing.

6—During the bull floating process, it was noted that the concrete was much easier to close than that of a traditional ready-mix process.

7—During the finish process where bleed water is generally present, this process presented no bleed water. However, the surface remained moist. The team speculated that unlike concrete prepared from traditional ready-mix products, the water, surprisingly, was retained within the concrete surface under conditions which would, with ready-mixes in the absence of E5 INTERNAL CURE, likely give a much drier surface.

8—The team then spent 4 hours completing the concrete finishing process. Unlike concrete prepared from traditional ready-mixes, the finishing process could be performed with the machines running at half throttle because of the moisture still present at the concrete surface. This lead to a much easier finishing process. Traditional concrete requires machines to be run at a throttle of 100% and is a more labor-intensive process involving an increased risk of surface damage during finishing.

9—The team also noted that the internal thermal temperature swing was in excess of 50° F. In fact, because the pour was located against a metal building, the internal concrete temperature swing as measured by internal sensors was from a daytime high of 145° F. to a night time low 70° F. In the experience of the team, these temperature swings would be expected to result in significant cracking of the concrete during curing (see 10, below). In the vast experience of the team, thermal temperatures are generally one of the greatest accelerators to the evaporation of moisture at the surface of concrete. The day of this pour the team noticed that the moisture remained at the surface and seemed relatively unaffected by the thermal temperature swings. The team knew such behavior was entirely different than that of traditional poured concrete and could be extremely useful in the industry.

10—In the experience of the team, traditional concrete would normally require saw cutting within 24 hours of the pour. However, the team did not saw cut because of the increased amount of water clearly retained in the upper surface of the concrete and the likelihood that as a result, the shrinkage timing (time over which shrinking would normally occur) would be decreased and likely reduce cracking. Therefore, the concrete slab was allowed to remain undisturbed so that the team could determine how long it would take for the slab to internally release. To the surprise of the team, the slab did not internally release itself for 10 days. It should be noted that there were significant environmental changes such as temperature and rain. Without desiring to be bound by theory, the team surmised that the addition of E5 INTERNAL CURE was causing much of the water to be retained, likely through chemical association with the amorphous silica in E5 INTERNAL CURE, rather than lost through evaporation. It is further surmised that much of the retained water ultimately participated in hydration to give internal curing. The retention of water through chemical association with amorphous silica in E5 INTERNAL CURE (added to concrete prior to pouring, such as, for example to the ready-mix truck), to be later incorporated through hydration (internal curing), has not been observed before, as can best be determined by the team.

Example 2

This was done to ensure consistency in the performance of the product and to understand the process for maximum effect of internal cure.

Location: Beach Grove, Ind. at the Shelby Materials ready-mix plant

Timeframe: poured between 08:30 am and 09:35 am.

Environmental Conditions: 79° F., relative humidity ranged from 61% to 93%, cloudy and wind speed ranged from 6.9 to 12.7 mph.

Steps and Results:

1—The concrete for two samples was 5.5 bags (517 lbs) of cement, 0.5 water to cement ratio (31 gallons of water (SSD—Saturated Surface Dry) non-air entrained, 5.5 inch slump (517 lbs. of cement, 1225 lbs. of Sand, and 1800 lbs. of Stone per yard). The finishing process was the same as that of Example 1.

2—Sample 1 was poured as a reference. Sample 1 was done and placed as a 4" thick slab. The concrete slab was also cured by applying plastic sheeting on top of the slab for 7 days as recommended by the American Concrete Institute (ACI). The compressive strength was measured 7 days after pouring to be 5760 psi.

3—Sample 2 was poured as with Sample 1, but with the addition, after mixing of cement, aggregate and sand, (517 lbs. of cement, 1225 lbs. of Sand, and 1800 lbs. of Stone per yard) of E5 INTERNAL CURE (3.5 oz per 100 lbs. of cement). It was cured as Sample 1. 7 days after pouring, the compressive strength was measured to be 6580 psi. The difference between sample 1 and 2 (with E5 INTERNAL CURE) was a 14% increase in strength.

4—The team of professionals then did a 28-day strength test as recommended by ACI (American Concrete Institute) to further support the idea that E5 INTERNAL CURE promoted internal curing, thus chemically binding the water to the concrete. The 28-day test results were as follows: Reference compressive strength: 6910 psi. Compressive strength when E5 INTERNAL CURE is included in the poured concrete: 8040 psi. The E5 INTERNAL CURE increases the compressive strength psi by 16%.

Example 3

Sixteen industrial-scale batches of concrete were prepared. Cylinders from each sample were taken and tested for compression strength in accordance with ASTM C-39, at 3, 7 and 28 days. All samples included 1350 lbs sand. For all samples, the Ready-mix was driven an average of 20 minutes to the job site, and concrete test cylinders were then poured in accordance with ASTM C-39. The results are given in the table shown in FIG. 1.

The first group of four (samples 1-4), the "Concrete Control" group, are prepared without the addition of colloidal silica. Water/Cement ratio of 0.51. They were prepared by adding roughly 40% of the indicated water to a Ready-mix which was rotating at 2-5 rpm, followed by the addition of the total indicated quantities of cement mix, aggregate and sand. The aggregate in all samples in the study was (¾" #8 ASTM C-33 #8 INDOT approved) gravel. The water and dry components were mixed for 1-2 minutes, which includes the time it took to add the components to the Ready-mix drum. The remaining water (approximately 60% of the water indicated) was then added to the Ready-mix. The mixture was mixed in a concrete drum that has a high speed of 12-15 RPM's for mixing of the concrete) for an additional time of 5-10 Minutes. When the driver was ready to transport the concrete to the job location he then slowed the concrete barrel to 3-5 RPM's. The Ready-mix was driven to the job site, and concrete test cylinders were then poured in accordance with ASTM C-39.

The second group of four (Samples 5-8) are prepared with the addition of 4 oz of a colloidal silica solution (E5 Internal Cure: approximately 15 wt % silica, average particle size of less than 10 nm, with a BET surface area of approximately 550 $m^2$/g, and 85 wt % water) per hundredweight cement (cwt).

The procedure for samples 7 and 8 (4 oz/cwt after tail water) is the same as for samples 1-4, but, additionally, 4 oz/cwt E5 Internal Cure were then added after the barrel was slowed to 3-5 rpm. The Ready-mix mixed the batch for about 5 minutes at 12-20 rpm. The Ready-mix was slowed to 3-5 rpm and driven to the job site, and concrete test cylinders were then poured in accordance with ASTM C-39.

The procedure for samples 5 and 6 (4 oz/cwt before tail water) was as for samples 1-4, except that E5 Internal Cure was included in the initial concrete mix, and the order of addition was cement mix, aggregate/sand, 4 oz/cwt E5 Internal Cure, 40% of water.

The procedure for Samples 9-12 (2, 4, 6 and 8 oz/E5 Internal Cure/cwt before tail water; W/C=0.41) is the same as that for Samples 6 and 7. Note that the amount of E5 Internal Cure increases for each sample, and the water/cement ratio is not 0.51, as with samples 1-8, but 0.41.

The procedure for Samples 13-16 (2, 4, 6 and 8 oz/E5 Internal Cure/cwt after tail water; W/C=0.41) is the same as that for Samples 7 and 8. Note that the amount of E5 Internal Cure increases for each sample, and the water/cement ratio is not 0.51, as with samples 1-8, but 0.41.

For each sample, the compressive strength was measured from cylinders aged to 3, 7 and 28 days. Note that the compressive strength measured for groups of similar samples (1-4; 5 and 6; 7 and 8; 9-12; 13-16) reflect a natural spread which is the result of variations in many factors which prevent the samples from being perfectly identical. The samples are ordered in order of ascending compressive strength only for convenience.

In every case in which the silica was added after the tailwater, the concrete showed little, if any bleedwater, curling, cracking or shrinkage. The same amount of silica added prior to the water gave a cement which had a bleedwater amount which was similar to the control, or in some cases, worse than the control. The foregoing held true for both water/cement ratios (0.51 and 0.41). The compressive strength generally showed an increase with the use of the silica, with more silica giving a higher increase in compressive strength. However, the post-tail water addition gave a significantly larger increase than the pre-water addition of the silica. This advantage is in addition to the earlier-noted advantage of greatly reduced bleedwater and curling cracking and shrinkage. Without desiring to be bound by theory, it is thought that the silica, when added after the water has been mixed with the other dry components, can reduce the water evaporation from the upper layers more efficiently than if it is added to the dry components prior to the water, or possibly even to insufficiently mixed concrete mix which contains water. Thus, the examples above illustrate that adding the silica to a well-mixed and wetted concrete mix, particularly after the addition of the tailwater, unexpectedly gives an unexpectedly large improvement in compressive strength, as well as less or no bleedwater, and fewer or no defects associated with high evaporation from the exposed upper surface of the curing concrete.

The invention claimed is:

1. A process for the preparation of a concrete installation, said process comprising the steps of:
    A) creating a concrete mix from components, said components comprising each of the following:
        a) a quantity of dry cement mix, said cement mix characterized by:
            i) a manufacturer suggested water/cement ratio value; wherein said suggested ratio falls in the range of from about 0.35 to about 0.65; and whereupon combination with b), the water/cement ratio is greater than the value corresponding to about 10% less than the suggested value and not greater than the value corresponding to about 30% greater than the suggested value; or
            ii) manufacturer suggested water/cement ratio range, having an upper value and a lower value, and whereupon combination with b) below, the water/cement ratio is greater than the value corresponding to about 10% less than the lower value and less than the value corresponding to about 30% greater than the upper value; or
            iii) an amount such that, whereupon combination with b) below, the water/cement ratio is in the range of from about 0.35 to 0.65;
        b) a quantity of water,
        c) a quantity of amorphous silica in the range of from about 0.1 to about 7.0 ounces per hundredweight of cement in a); wherein the average silica particle size is in the range of from about 1 to about 55 nanometers and/or wherein the surface area of the silica particles is in the range of from about 50 to about 900 $m^2/g$;
        d) a quantity of aggregate and/or a quantity of sand in the range of from about 400 to about 700 wt % bwoc; wherein the amorphous silica is dispersed in the concrete mix without using a superplasticizer; and
    B) wherein the water of b) is added in its entirety or in portions comprising an initial portion, comprising at least about 20 wt % of the quantity of water, and a tailwater portion; wherein the initial portion of water is combined with a) and the components of d) to form a first mix; and wherein the amorphous silica is added to the first mix to form a second mix;
        AND wherein the tailwater is 1) added to the first mix or 2) added to the second mix; or 3) is co-added with the amorphous silica to the first mix, wherein the amorphous silica and the tailwater are, optionally, added optionally intercombined; and wherein 1) the first mix is agitated for a time $t_{11}$ prior to the addition of the tailwater, for a time $t_{12}$ after the addition of the tailwater but before the addition of the amorphous silica, and for a time $t_{13}$ after the addition of the amorphous silica; or 2) the first mix is agitated for a time $t_{21}$ prior to the addition of the amorphous silica, for a time $t_{22}$ after the addition of the amorphous silica but before the addition of the tailwater, and for a time $t_{23}$ after the addition of the tailwater; or 3) the first mix is agitated for a time $t_{31}$ prior to co-addition of the amorphous silica and the tailwater, and whereupon the concrete mix is then agitated for a time $t_{32}$;
    OR
    C) wherein the quantity of water is added to a) and the components of d) to form a mix, whereupon said mix is agitated for a time $t_a$ prior to the addition of the amorphous silica, whereupon the concrete mix is then agitated for a time $t_b$; and
    D) pouring the concrete mix of B) or C) to form a concrete installation;
    wherein $t_{11}$ is in the range of from about 2 minutes to about 8 minutes, $t_{12}$ is in the range of from about 0.5 to about 4 minutes, $t_{13}$ is in the range of from about 2 minutes to about 10 minutes, $t_{21}$ is in the range of from about 2 minutes to about 8 minutes, $t_{22}$ is in the range of from about 0.5 minutes to about 2 minutes, $t_{23}$ is in the range of from about 2 minutes to about 10 minutes, $t_{31}$ is in the range of from about 2 minutes to about 8 minutes, $t_{32}$ is in the range of from about 2 minutes to about 10 minutes, $t_a$ is in the range of from about 2 minutes to about 8 minutes and $t_b$ is in the range of from about 2 minutes to about 10 minutes.

2. A process as in claim 1, wherein the initial portion of water comprises at least 30 wt % of the quantity of water.

3. A process as in claim 1, wherein upon combination of the dry cement mix of a) with the water of b), the water/cement ratio is:
equal to or greater than the suggested value in i), but less than the value corresponding to 30% greater than the suggested value; or
equal to or greater than the upper value of the suggested range in ii), but not greater than the value corresponding to 30% greater than the upper value; or
with respect to iii) at least 0.35, but not greater than 0.65.

4. A process as in claim 1, wherein the amorphous silica is introduced into the first mix as a colloidal silica solution and wherein the solution comprises between about 50 and about 95 wt % water, and between about 5 to about 50 wt % silica.

5. A process as in claim 4, wherein the silica comprises between about 75 and about 90 wt % water and between about 10 and about 25 wt % silica.

6. A process as in claim 5, wherein the amorphous silica is added in an amount in the range of from about 2.5 to about 5.5 ounces per hundredweight cement.

7. A process as in claim 6, wherein the amorphous silica is added in an amount in the range of from about 3.5 to about 4.5 ounces per hundredweight cement.

8. A process as in claim 1, wherein the amorphous silica is added after the tailwater.

9. A process as in claim 1 wherein the concrete is poured into slab or a footing.

10. A process as in claim 1, wherein the process is conducted in a Ready-mix; wherein the tailwater is added to the first mix after the first mix is agitated at a speed in the range of from about 2 rpm to about 18 rpm for a time in the range of from 15 seconds to 5 minutes; wherein after the tailwater addition, the mix is agitated at a speed in the range of from about 5 rpm to about 18 rpm, for a time in the range of from about 1 minute to about 18 minutes, after which the silica is added, as colloidal silica, to the Ready-mix, and the mix is agitated for a time in the range of from about 1 to about 15 minutes at a speed in the range of from about 2 to about 18 rpm; wherein the concrete is then poured as a slab form.

11. A process as in claim 4, wherein the process is conducted in a Ready-mix; wherein the tailwater is added to the first mix after the first mix is agitated at a speed in the range of from about 2 rpm to about 18 rpm for a time in the range of from 15 seconds to 5 minutes; wherein after the tailwater addition, the mix is agitated at a speed in the range of from about 5 rpm to about 18 rpm, for a time in the range of from about 1 minute to about 18 minutes, after which the silica is added, as colloidal silica, to the Ready-mix, and the mix is agitated for a time in the range of from about 1 to about 15 minutes at a speed in the range of from about 2 to about 18 rpm; wherein the concrete is then poured as a slab form.

12. A process for the preparation of a concrete installation, said process comprising the steps of:
A) creating a concrete mix from components, said components comprising each of the following:
a) a quantity of dry cement mix, said cement mix characterized by:
i) a manufacturer suggested water/cement ratio value; wherein said suggested ratio falls in the range of from about 0.35 to about 0.65; and whereupon combination with b), the water/cement ratio is greater than the value corresponding to about 10% less than the suggested value and not greater than the value corresponding to about 30% greater than the suggested value; or
ii) manufacturer suggested water/cement ratio range, having an upper value and a lower value, and whereupon combination with b) below, the water/cement ratio is greater than the value corresponding to about 10% less than the lower value and less than the value corresponding to about 30% greater than the upper value; or
iii) an amount such that, whereupon combination with b) below, the water/cement ratio is in the range of from about 0.35 to 0.65;
b) a quantity of water,
c) a quantity of amorphous silica in the range of from about 0.1 to about 7.0 ounces per hundredweight of cement in a); wherein the average silica particle size is in the range of from about 1 to about 55 nanometers and/or wherein the surface area of the silica particles is in the range of from about 50 to about 900 $m^2/g$; and
d) a quantity of aggregate and/or a quantity of sand in the range of from about 400 to about 700 wt % bwoc;
wherein the concrete mix is essentially superplasticizer-free; and
B) wherein the water of b) is added in its entirety or in portions comprising an initial portion, comprising at least about 20 wt % of the quantity of water, and a tailwater portion; wherein the initial portion of water is combined with a) and the components of d) to form a first mix; and wherein the amorphous silica is added to the first mix to form a second mix;
AND wherein the tailwater is 1) added to the first mix or 2) added to the second mix; or 3) is co-added with the amorphous silica to the first mix, wherein the amorphous silica and the tailwater are, optionally, intercombined; and wherein 1) the first mix is agitated for a time $t_{11}$ prior to the addition of the tailwater, for a time $t_{12}$ after the addition of the tailwater but before the addition of the amorphous silica, and for a time $t_{13}$ after the addition of the amorphous silica; or 2) the first mix is agitated for a time $t_{21}$ prior to the addition of the amorphous silica, for a time $t_{22}$ after the addition of the amorphous silica but before the addition of the tailwater, and for a time $t_{23}$ after the addition of the tailwater; or 3) the first mix is agitated for a time $t_{31}$ prior to co-addition of the amorphous silica and the tailwater, and whereupon the concrete mix is then agitated for a time $t_{32}$;
OR
C) wherein the quantity of water is added to a) and the components of d) to form a mix, whereupon said mix is agitated for a time $t_a$ prior to the addition of the amorphous silica, whereupon the concrete mix is then agitated for a time $t_b$; and
D) pouring the concrete mix of B) or C) to form a concrete installation;
wherein $t_{11}$ is in the range of from about 2 minutes to about 8 minutes, $t_{12}$ is in the range of from about 0.5 to about 4 minutes, $t_{13}$ is in the range of from about 2 minutes to about 10 minutes, $t_{21}$ is in the range of from about 2 minutes to about 8 minutes, $t_{22}$ is in the range of from about 0.5 minutes to about 2 minutes, $t_{23}$ is in the range of from about 2 minutes to about 10 minutes, $t_{31}$ is in the range of from about 2 minutes to about 8 minutes, $t_{32}$ is in the range of from about 2 minutes to about 10 minutes, $t_a$ is in the range of from about 2 minutes to about 8 minutes and $t_b$ is in the range of from about 2 minutes to about 10 minutes.

13. A process as in claim 12 wherein the initial portion of water comprises at least 30 wt % of the quantity of water.

14. A process as in claim 12, wherein upon combination of the dry cement mix of a) with the water of b), the water/cement ratio is:
   equal to or greater than the suggested value in i), but less than the value corresponding to 30% greater than the suggested value; or
   equal to or greater than the upper value of the suggested range in ii), but not greater than the value corresponding to 30% greater than the upper value; or
   with respect to iii) at least 0.35, but not greater than 0.65.

15. A process as in claim 12, wherein the amorphous silica is added after the tailwater.

16. A process as in claim 12, wherein the concrete is poured into slab or a footing.

17. A process as in claim 12, wherein the process is conducted in a Ready-mix; wherein the tailwater is added to the first mix after the first mix is agitated at a speed in the range of from about 2 rpm to about 18 rpm for a time in the range of from 15 seconds to 5 minutes; wherein after the tailwater addition, the mix is agitated at a speed in the range of from about 5 rpm to about 18 rpm, for a time in the range of from about 1 minute to about 18 minutes, after which the silica is added, as colloidal silica, to the Ready-mix, and the mix is agitated for a time in the range of from about 1 to about 15 minutes at a speed in the range of from about 2 to about 18 rpm; wherein the concrete is then poured as a slab form.

18. A process for the preparation of a concrete mixture in a mixing truck, said process comprising the steps of:
   A) creating a concrete mix from components in the mixing truck, said components comprising each of the following:
      a) a quantity of dry cement mix, said cement mix characterized by one of:
         i) a manufacturer suggested water/cement ratio value; wherein said suggested ratio value falls in the range of from about 0.35 to about 0.65; and whereupon in combination with b), the water/cement ratio is not greater than the value corresponding to about 30% greater than the suggested value;
      or
         ii) a manufacturer suggested water/cement ratio range, the manufacturer suggested water/cement ratio range having an upper value and a lower value, and whereupon combination with b) below, the actual water/cement ratio is less than about 30% greater than the upper value;
      b) a quantity of water;
      c) a quantity of amorphous silica, wherein the average silica particle size is in the rang of from about 1 to about 55 nanometers and/or wherein the surface area of the particles of the amorphous silica is in the range of from about 50 to about 900 $m^2/g$;
      d) a quantity of aggregate and/or sand; and
   B) wherein the water of b) is added in its entirety or in portions comprising an initial portion, consisting of at least about 20 wt % of the quantity of water, and a tailwater portion; wherein the initial portion of water is combined with a) and the components of d) to form a first mix; and wherein the amorphous silica is added to the first mix to form a second mix;
   AND
   wherein the tailwater is 1) added to the first mix or 2) added to the second mix; or 3) is co-added with the amorphous silica to the first mix, wherein the amorphous silica and the tailwater are, optionally, intercombined; and wherein 1) the first mix is agitated for a time prior to the addition of the tailwater, for a time after the addition of the tailwater but before the addition of the amorphous silica, and for a time after the addition of the amorphous silica; or 2) the first mix is agitated for a time prior to the addition of the amorphous silica, for a time after the addition of the amorphous silica but before the addition of the tailwater, and for a time after the addition of the tailwater; or 3) the first mix is agitated for a time prior to co-addition of the amorphous silica and the tailwater, and whereupon the concrete mix is then agitated for a time;
   OR
   C) wherein the quantity of water of b) is added to a) and the components of d) to form a first mix, agitating the first mix for a first time, adding the amorphous silica of c) and adding a tailwater portion comprising the remainder of the quantity of water of b), if any, to the first mix to form a second mix, and agitating the second mix for a second time.

19. A process as in claim 18, wherein the amorphous silica is introduced into the first mix as a colloidal silica solution and wherein the solution comprises between about 50 and about 95 wt % water, and between about 5 to about 50 wt % silica.

20. A process as in claim 19, wherein the silica comprises between about 75 and about 90 wt % water and between about 10 and about 25 wt % silica.

* * * * *